(12) United States Patent
Zhang et al.

(10) Patent No.: US 10,042,238 B1
(45) Date of Patent: Aug. 7, 2018

(54) PROJECTOR

(71) Applicant: GEMMY INDUSTRIES CORPORATION, Coppell, TX (US)

(72) Inventors: Cheng-Chun Zhang, Shenzhen (CN); Lio Yenwei Chang, Coppell, TX (US)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 0 days.

(21) Appl. No.: 15/679,774

(22) Filed: Aug. 17, 2017

(51) Int. Cl.
*G03B 21/14* (2006.01)
*G03B 21/32* (2006.01)
*G03B 21/43* (2006.01)
*G03B 21/20* (2006.01)
*G03B 21/00* (2006.01)

(52) U.S. Cl.
CPC ......... *G03B 21/145* (2013.01); *G03B 21/005* (2013.01); *G03B 21/2006* (2013.01); *G03B 21/321* (2013.01); *G03B 21/326* (2013.01); *G03B 21/43* (2013.01)

(58) Field of Classification Search
CPC .... G03B 21/00; G03B 21/001; G03B 21/005; G03B 21/43; G03B 21/145; G03B 21/321; G03B 21/326; G03B 21/2006; G03B 23/02; G03B 23/105
See application file for complete search history.

(56) References Cited

U.S. PATENT DOCUMENTS

| 9,405,181 | B2 * | 8/2016 | Wong | G03B 37/00 |
| 2015/0022785 | A1 * | 1/2015 | Kinebuchi | F16M 11/00 353/52 |

\* cited by examiner

*Primary Examiner* — Sultan Chowdhury
(74) *Attorney, Agent, or Firm* — Rabin & Berdo, P.C.

(57) ABSTRACT

A projector has a body, a rotating device, a projection device, and a supporting device. The body has a lower housing, an upper housing, and an operation chamber. The rotating device is mounted in the operation chamber, is located in the upper housing, and has a driving device, a rotating axle, a power supply circuit board, and a film base. The projection device is mounted in the operation chamber of the body and has a light unit, a Fresnel lens, a film holder, and a lens assembly. The supporting device is mounted on a bottom of the lower housing.

8 Claims, 5 Drawing Sheets

PROJECTOR

BACKGROUND OF THE INVENTION

1. Field of the Invention

The present invention relates to a projector, and more particularly to a projector that can emit an image moving along a straight line.

2. Description of Related Art

A conventional projector can emit a moveable image and comprises a rotatable disk provided with patterns. When light is emitted from a light device onto an upper portion of the rotatable disk, the patterns on the upper portion of the rotatable disk can be projected. With the rotation of the rotatable disk, the patterns on the rotatable disk are also rotating and the projected images can be changed. When the patterns on the rotatable disk are animal figures, the animals will move along a circle having a center at a center of the rotatable disk. A visual effect of changes of positions of the animals is provided, so the images projected by the projector are attractive.

However, the patterns on the rotatable disk are moving around the center of the rotatable disk, so the images projected from the projector are moving along a curved path that is different from the moving path of real animals, i.e. along a straight line. When the patterns on the rotatable disk are words, the images of the words are also moving along a curved path, so a viewer must change his/her perspectives to match with the words moving in a curved path. This will cause discomfort to the viewer.

To overcome the shortcomings, the present invention tends to provide a projector to mitigate or obviate the aforementioned problems.

SUMMARY OF THE INVENTION

The main objective of the invention is to provide a projector that can project images moving along a straight line.

The projector has a body, a rotating device, a projection device, and a supporting device. The body has a lower housing, a film cover, an upper housing, and an operation chamber. The lower housing has a lower front opening defined in a front end of the lower housing. The film cover is mounted on the lower housing. The upper housing is combined with the lower housing and has an upper front opening defined in a front end of the upper housing to define a front opening incorporated with the lower front opening in the lower housing. The operation chamber is defined in the lower housing and the upper housing. The rotating device is mounted in the operation chamber, is located in the upper housing, and has a driving device, a rotating axle, a power supply circuit board, and a film base. The driving device is mounted in the upper housing. The rotating axle is connected rotatably with the driving device. The power supply circuit board is mounted in the upper housing and is connected electrically with the driving device. The rotatable film base is transparent, is connected with the rotating axle, and has a holding space defined in the film base. The projection device is mounted in the operation chamber of the body and has a light unit, a Fresnel lens, a film holder, and a lens assembly. The light unit is mounted in the upper housing and is held in the holding space of the film base. The Fresnel lens is mounted in the lower housing, extends into the holding space in the film base, and is located in front of the light unit. The film holder is mounted detachably in the lower housing and is located above the film cover. The lens assembly is mounted in the lower housing and extends out from the front opening. The supporting device is mounted on a bottom of the lower housing.

Other objects, advantages and novel features of the invention will become more apparent from the following detailed description when taken in conjunction with the accompanying drawings.

DETAILED DESCRIPTION OF PREFERRED EMBODIMENT

Figure 1:
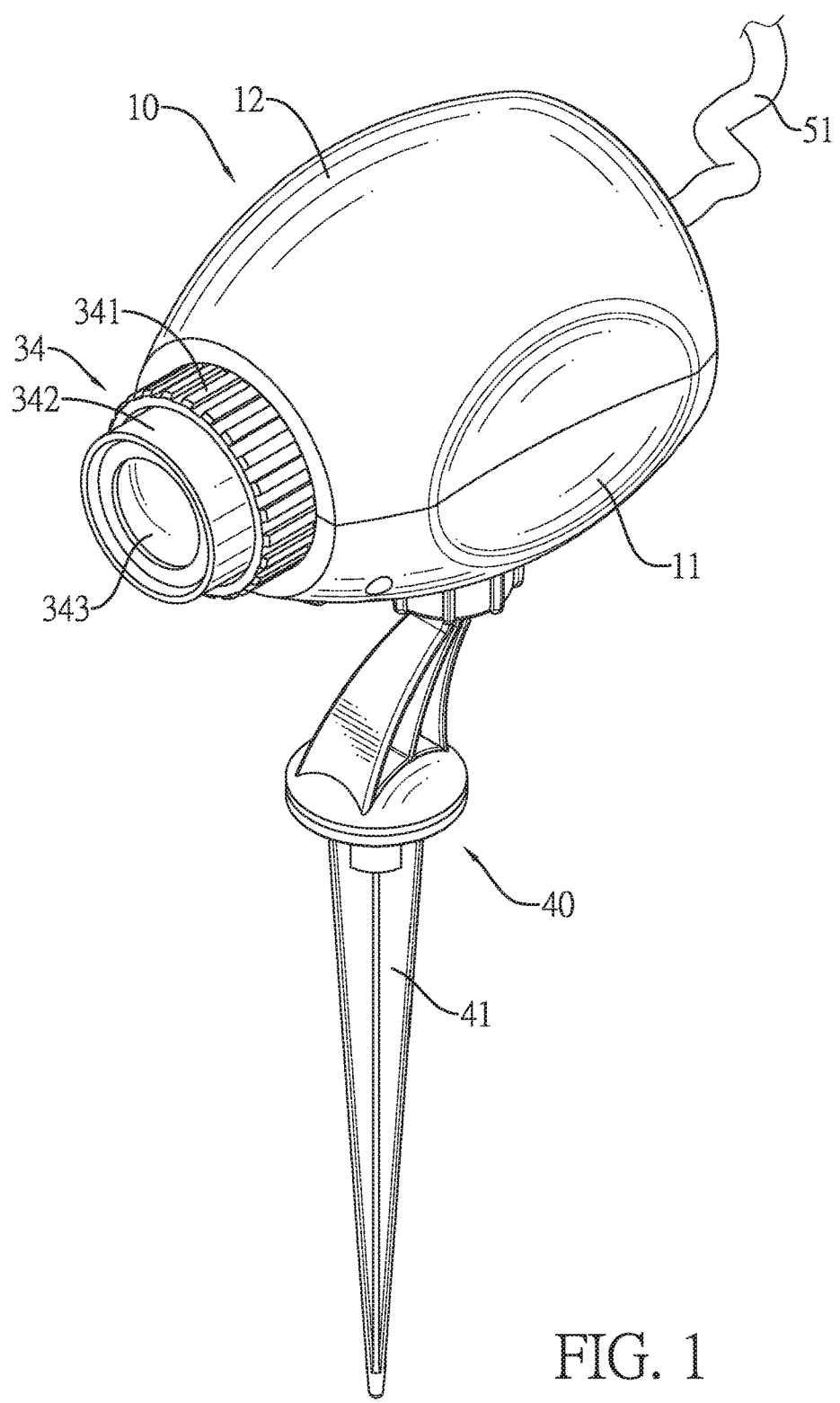
FIG. 1 is a perspective view of a projector in accordance with the present invention.

With reference to FIG. 1, a projector in accordance with the present invention comprises a body 10, a rotating device 20, a projection device 30, and a supporting device 40.

The body 10 comprises a lower housing 11, an upper housing 12, an operation chamber 14, and a film cover 13. The lower housing 11 has a lower front opening defined in a front end of the lower housing 11. The upper housing 12 is combined with the lower housing 11 and has an upper front opening defined in a front end of the upper housing to define a front opening 15 incorporated with the lower front opening in the lower housing 11. In addition, the upper housing 12 may further have an upper rear opening defined in a rear end of the upper housing 12. The lower housing 11 may further have a lower rear opening defined in a rear end of the lower housing 11 to define a rear opening 16 incorporated with the upper rear opening. The body 10 may further comprise a wire holder 17 mounted in the lower housing 11 at a position adjacent to the rear opening 16. The operation chamber 14 is defined in the lower housing 11 and the upper housing 12. The film cover 13 is mounted on the lower housing 11.

The rotating device 20 is mounted in the operation chamber 14, is located in the upper housing 12, and comprises a driving device 21, a rotating axle 22, a power supply circuit board 23, and a film base 24. The driving device 21 is mounted in the upper housing 12 in an inverted manner. The rotating axle 22 is connected rotatably with the driving device 21. The power supply circuit board 23 is mounted in the upper housing 12 and is electrically connected with the driving device 21. The film base 24 is transparent, is provided with patterns disposed around a periphery of the film base 24, is connected with the rotating axle 22, and has a holding space 25 defined in the rotatable film base 24.

The projection device 30 is mounted in the operation chamber 14 of the body 10 and comprises a light unit 31, a Fresnel lens 32, a film holder 33, and a lens assembly 34. The light unit 31 is mounted in the upper housing 12 and is held in the holding space 25 of the film base 24. The Fresnel lens 32 is mounted in the lower housing 11, extends into the holding space 25 in the film base 24, and is located in front of the light unit 31. The film holder 33 is mounted detachably in the lower housing 11 and is located above the film cover 13. The lens assembly 34 is mounted in the lower housing 11 and extends out from the front opening 15. The light unit 31 comprises a light base 311, a lighting element 312, and a light cup 313. The light base 311 is mounted in the upper housing 12 and is held in the holding space 25 in the film base 24. The lighting element 312 is mounted on a side of the light base 311 facing the Fresnel lens 32. Preferably, the lighting element 312 is a light emitting diode (LED). The light cup 313 is mounted on the light base 311, and the lighting element 312 is located between the light base 311 and the light cup 313. The lens assembly 34 comprises a rotatable sleeve 341, a lens base 342, and multiple convex lenses 343. The rotatable sleeve 341 is mounted rotatably in the front opening 15 in the body 10. The rotatable sleeve 341 is mounted around the lens base 342. The convex lenses 343 are mounted in the lens base 342 with fixed intervals between the convex lenses 343.

The supporting device 40 is mounted on a bottom of the lower housing 11. Preferably, the supporting device 40 is a ground insert.

Figure 2:
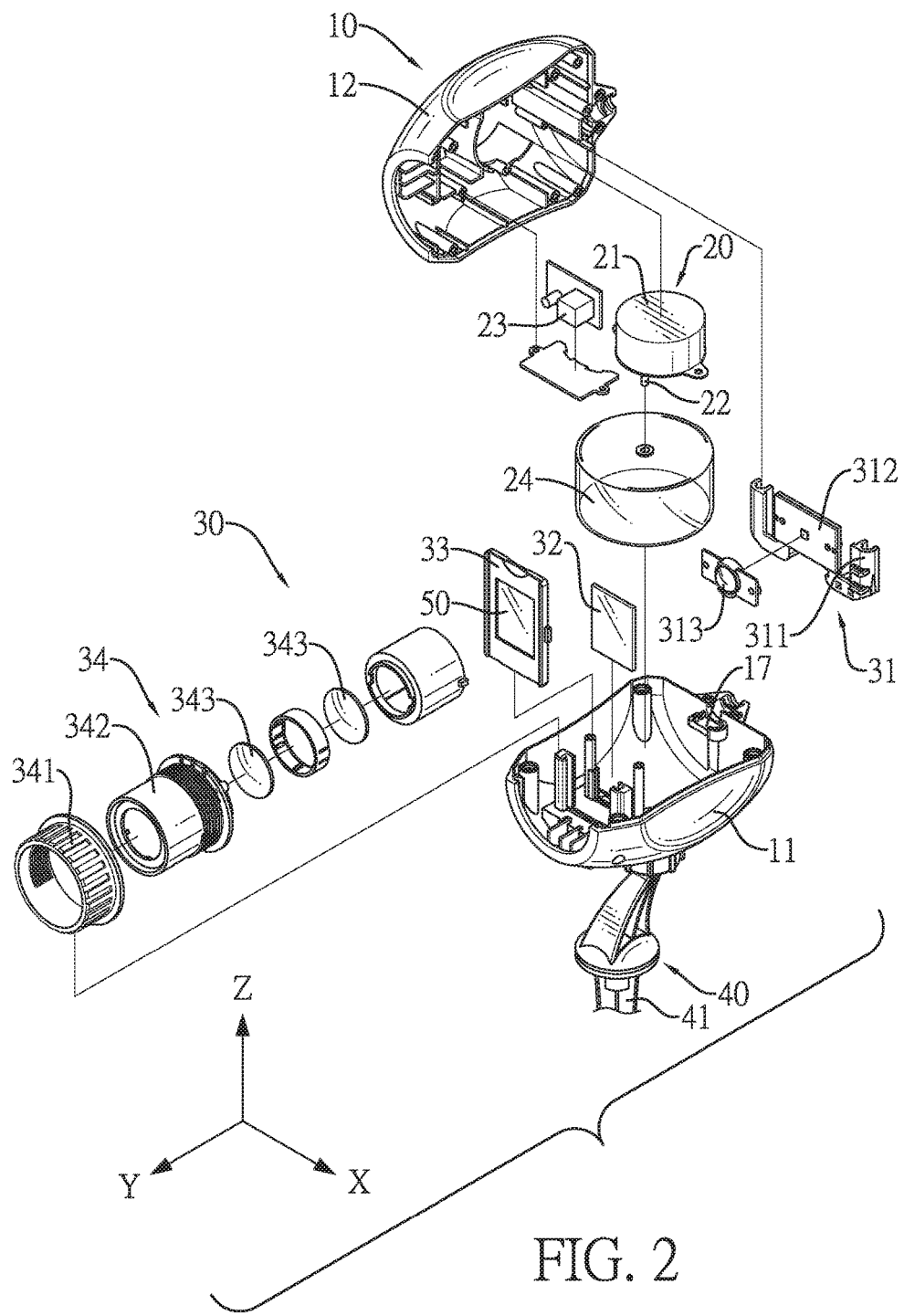
FIG. 2 is an exploded perspective view of the projector in FIG. 1.
Figure 3:
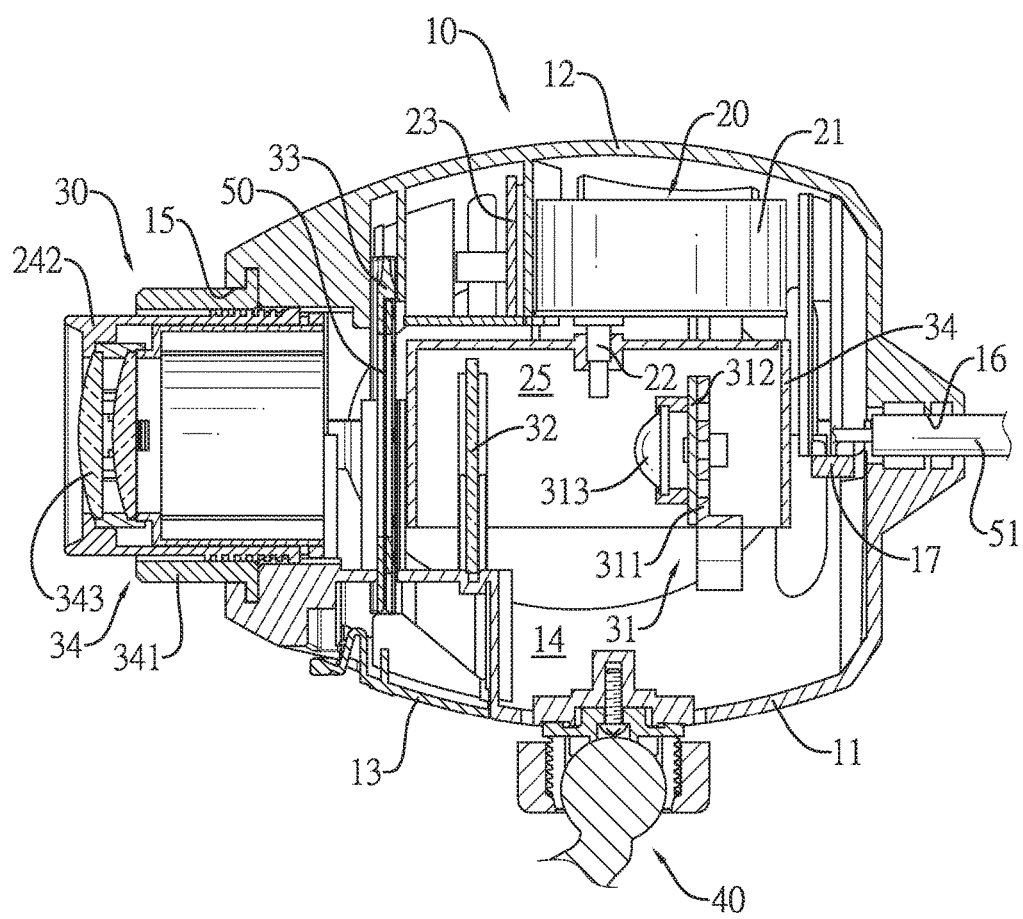
FIG. 3 is an enlarged side view in partial section of the projector in FIG. 1.
Figure 4:
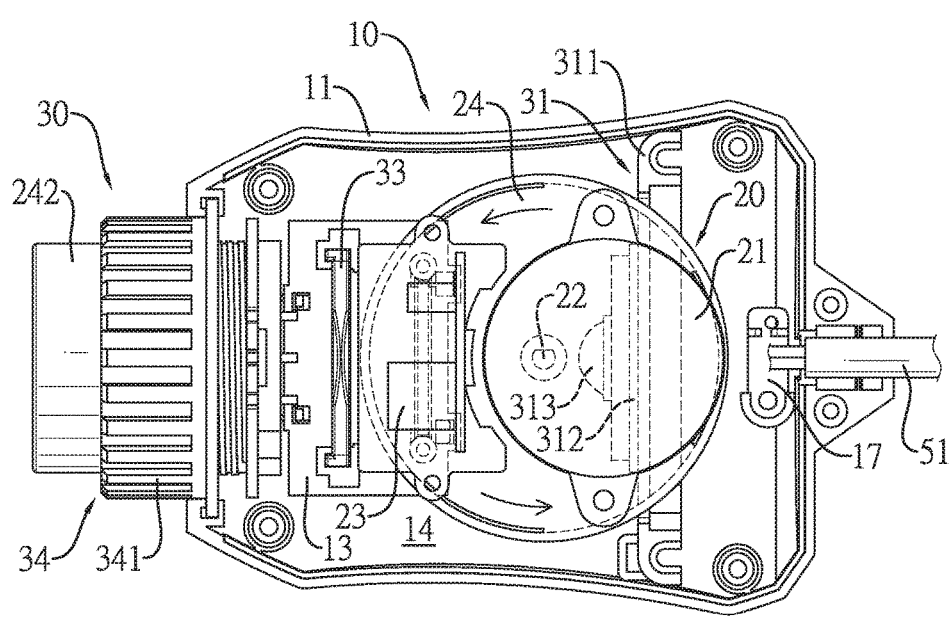
FIG. 4 is an enlarged top view of the projector in FIG. 1.
Figure 5:
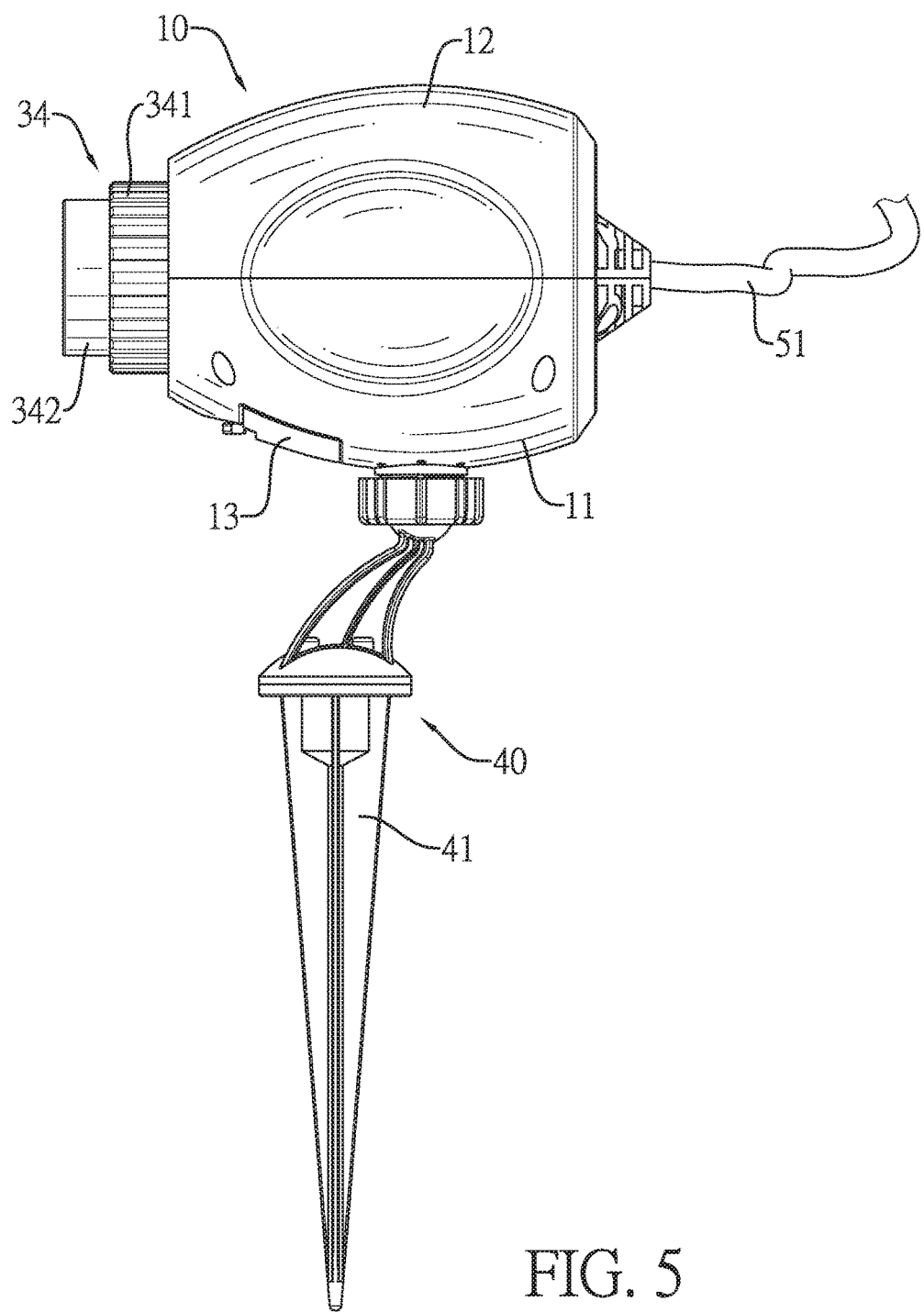
FIG. 5 is an operational side view of the projector in FIG. 1.

With reference to FIGS. 2 to 4, when the projector is in use, the film cover 13 is opened and the film holder 33 is detached from and taken out of the body 10. A film 50 having a background pattern is attached securely to the film holder 33, the film holder 33 with the film 50 is put into the body 10, and the film cover 13 is closed. An electric wire 51 is inserted into the body 10 via the rear opening 16, is electrically connected with the power supply circuit board 23, and is securely held by the wire holder 17. The power supply circuit board 23 can convert the alternate currents (AC) provided from the electric wire 51 to direct currents (DC) and provides the DC to the driving device 21 and the light unit 31. When the driving device 21 is actuated, the rotating axle 22 is driven to rotate clockwise or counterclockwise by the driving device 21. The film base 24 is also driven to rotate counterclockwise by the rotating axle 22, and the patterns on the film base 24 are rotating along a direction driven by the driving device 21.

When the light unit 31 is actuated, the lighting element 312 will be lighted up to emit light. The light emitted from the lighting element 312 will pass through the light cup 313 and the Fresnel lens 32 and is concentrated into multiple parallel light beams. When the parallel light beams pass through the rotating film base 24 and the film 50 on the film holder 33, the patterns on the rotating film base 24 and the background pattern on the film 50 will be projected. By rotating the rotatable sleeve 341, the position of the lens base 342 in the body 10 can be changed, such that the distances between the convex lens 343 and the film holder 33 and between the convex lens 343 and the film base 24 can also be changed. Consequently, the images projected from the projector can be adjusted to a clear status. Accordingly, multiple continuously moving patterns on a stationary background pattern can be projected. The continuously moving patterns are moving along a straight line, so a viewer can keep a stationary perspective to see the moving images.

With the arrangement of the rotatable film base 24 and the fixed film holder 33, multiple moving images on a stationary background pattern can be projected. When the patterns on the film base 24 are words, the images of the words are moved along a straight line, such that the viewer does not have to change his/her perspective and discomfort is avoided. The background image can be changed by changing different films 50 having different patterns on the film holder 33. The color of the light emitted from the lighting element 312 can also been changed, such that the projector in accordance with the present invention is versatile in use.

In addition, the film base 24 is rotatable along the Z axis as shown in FIG. 2. Alternatively, the film base 24 can be arranged to be rotatable along the X axis or Y axis as shown in FIG. 2.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projector comprising:
    a body comprising
        a lower housing having a lower front opening defined in a front end of the lower housing;
        a film cover mounted on the lower housing;
        an upper housing combined with the lower housing and having an upper front opening defined in a front end of the upper housing to define a front opening incorporated with the lower front opening in the lower housing; and
        an operation chamber defined in the lower housing and the upper housing;
    a rotating device mounted in the operation chamber, located in the upper housing, and having
        a driving device mounted in the upper housing;
        a rotating axle connected rotatably with the driving device;
        a power supply circuit board mounted in the upper housing and connected electrically with the driving device; and
        a film base being transparent, connected with the rotating axle, and having a holding space defined in the film base;
    a projection device mounted in the operation chamber of the body and having
        a light unit mounted in the upper housing and held in the holding space of the film base;
        a Fresnel lens mounted in the lower housing, extending into the holding space in the film base, and located in front of the light unit;
        a film holder mounted detachably in the lower housing and located above the film cover; and
        a lens assembly mounted in the lower housing and extending out from the front opening; and
    a supporting device mounted on a bottom of the lower housing.

2. The projector as claimed in claim 1, wherein the light unit comprises:
    a light base mounted in the upper housing;
    a lighting element mounted on a side of the light base facing the Fresnel lens; and
    a light cup mounted on the light base, wherein the lighting element is located between the light base and the light cup.

3. The projector as claimed in claim 2, wherein the lens assembly comprises:
    a rotatable sleeve mounted rotatably in the front opening in the body;
    a lens base mounted around by the rotatable sleeve; and
    multiple convex lenses mounted in the lens base with fixed intervals between the convex lenses.

4. The projector as claimed in claim 1, wherein the lens assembly comprises:
- a rotatable sleeve mounted rotatably in the front opening in the body;
- a lens base mounted around by the rotatable sleeve; and
- two convex lenses mounted in the lens base with a fixed interval between the convex lenses.

5. The projector as claimed in claim 4, wherein
the upper housing further has an upper rear opening defined in a rear end of the upper housing;
the lower housing further has a lower rear opening defined in a rear end of the lower housing to define a rear opening incorporated with the upper rear opening; and
the body further comprises a wire holder mounted in the lower housing at a position adjacent to the rear opening.

6. The projector as claimed in claim 3, wherein
the upper housing further has an upper rear opening defined in a rear end of the upper housing;
the lower housing further has a lower rear opening defined in a rear end of the lower housing to define a rear opening incorporated with the upper rear opening; and
the body further comprises a wire holder mounted in the lower housing at a position adjacent to the rear opening.

7. The projector as claimed in claim 2, wherein
the upper housing further has an upper rear opening defined in a rear end of the upper housing;
the lower housing further has a lower rear opening defined in a rear end of the lower housing to define a rear opening incorporated with the upper rear opening; and
the body further comprises a wire holder mounted in the lower housing at a position adjacent to the rear opening.

8. The projector as claimed in claim 1, wherein
the upper housing further has an upper rear opening defined in a rear end of the upper housing;
the lower housing further has a lower rear opening defined in a rear end of the lower housing to define a rear opening incorporated with the upper rear opening; and
the body further comprises a wire holder mounted in the lower housing at a position adjacent to the rear opening.

* * * * *